Figure 1:
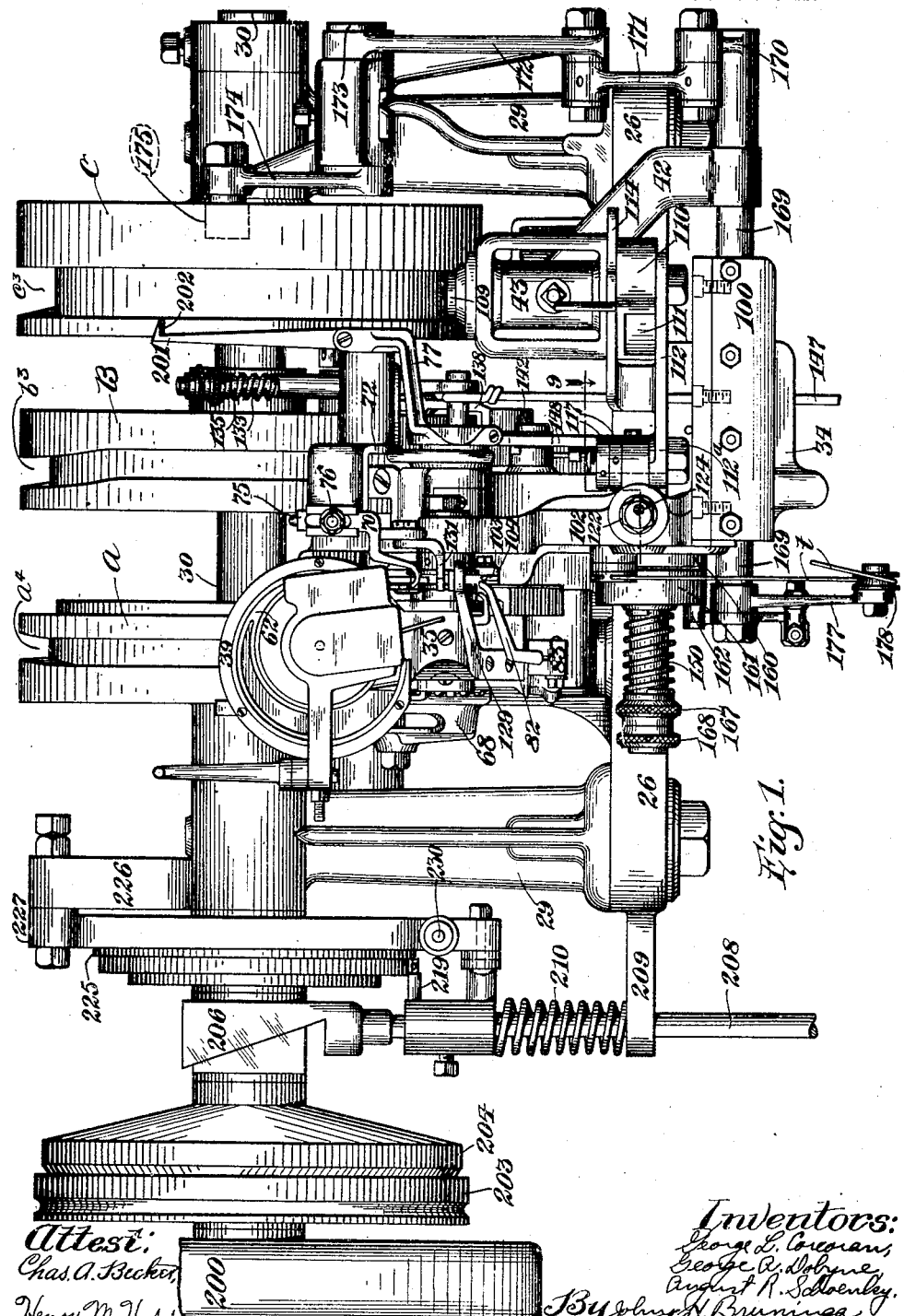

G. L. CORCORAN, G. A. DOBYNE & A. R. SCHOENKY.
SHOE SEWING MACHINE.
APPLICATION FILED JUNE 5, 1911.

1,198,328.

Patented Sept. 12, 1916.
9 SHEETS—SHEET 3.

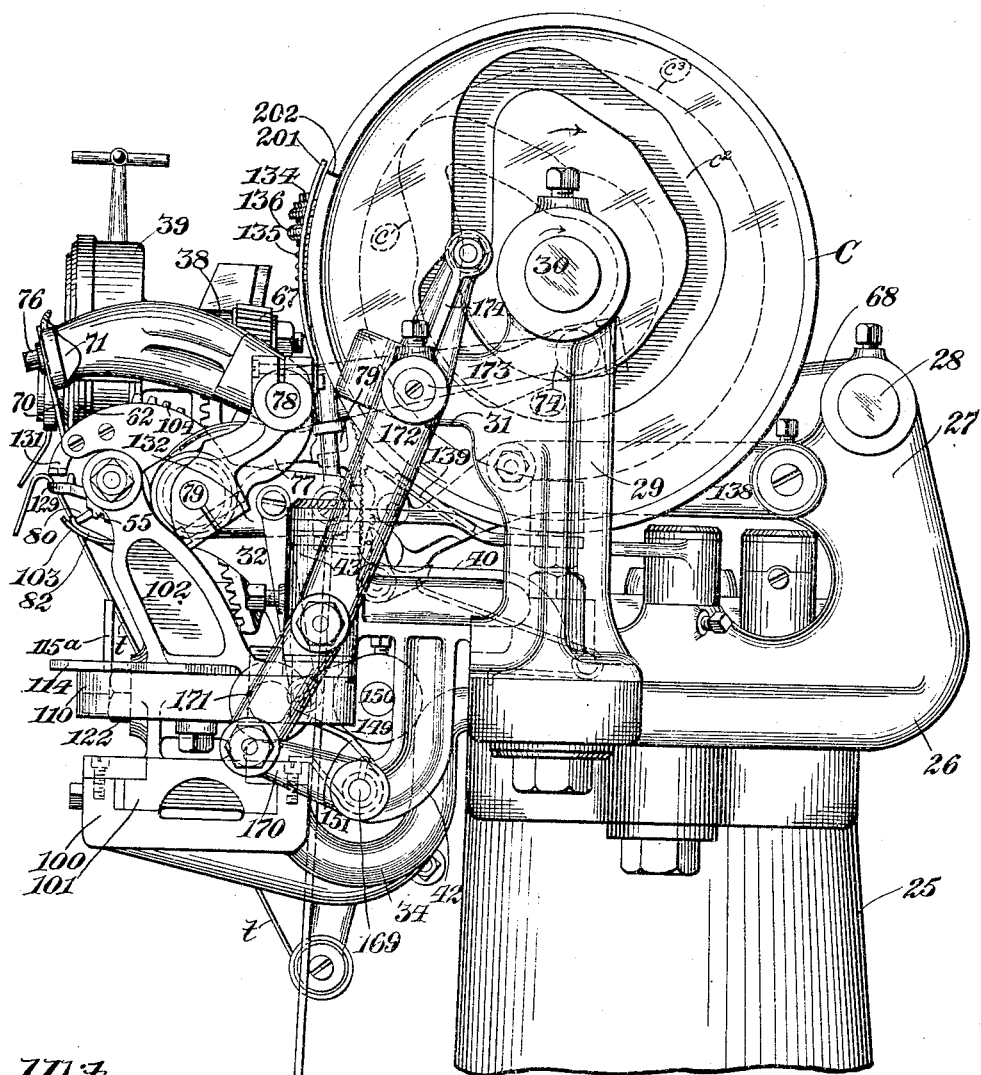

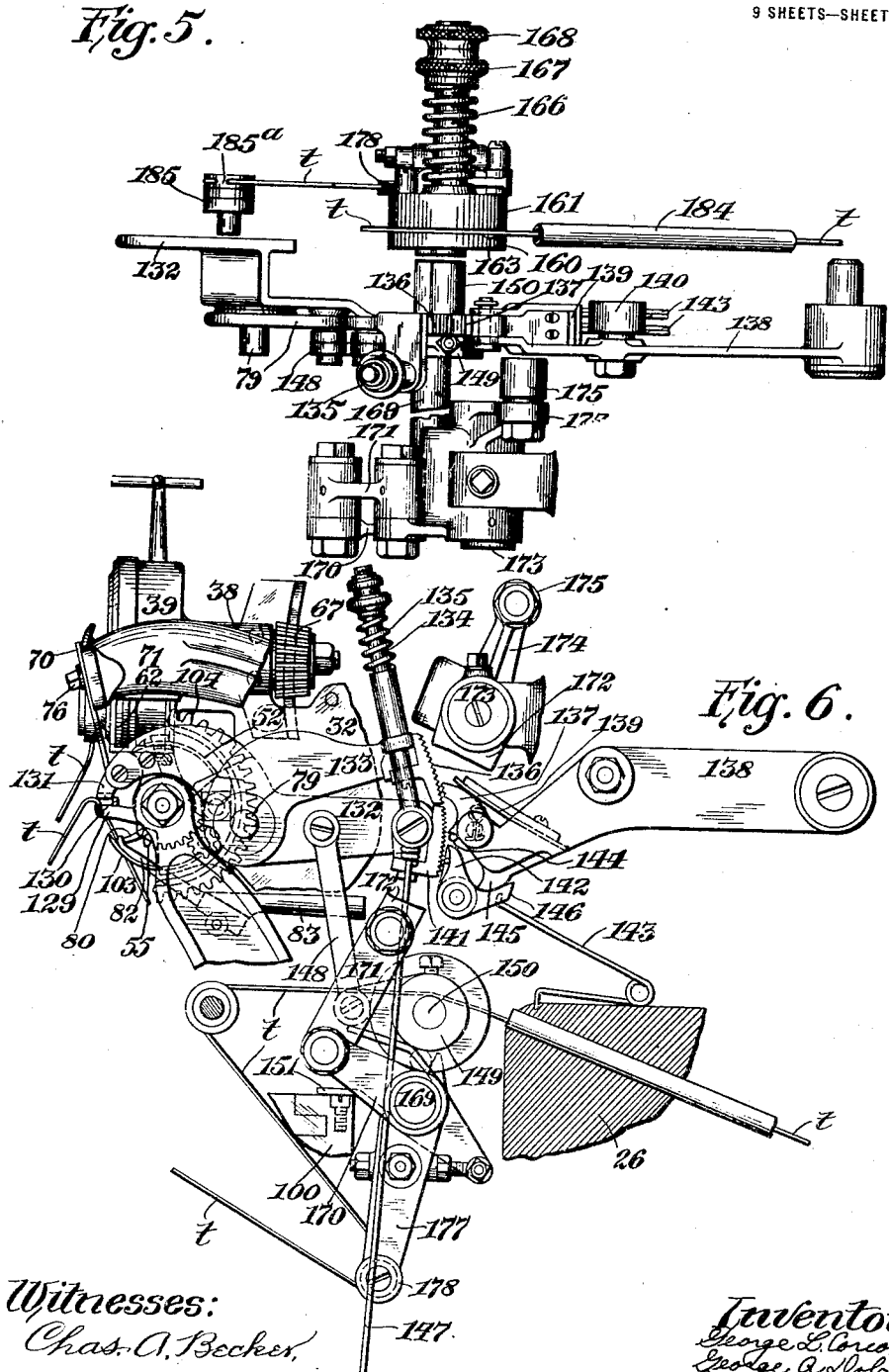

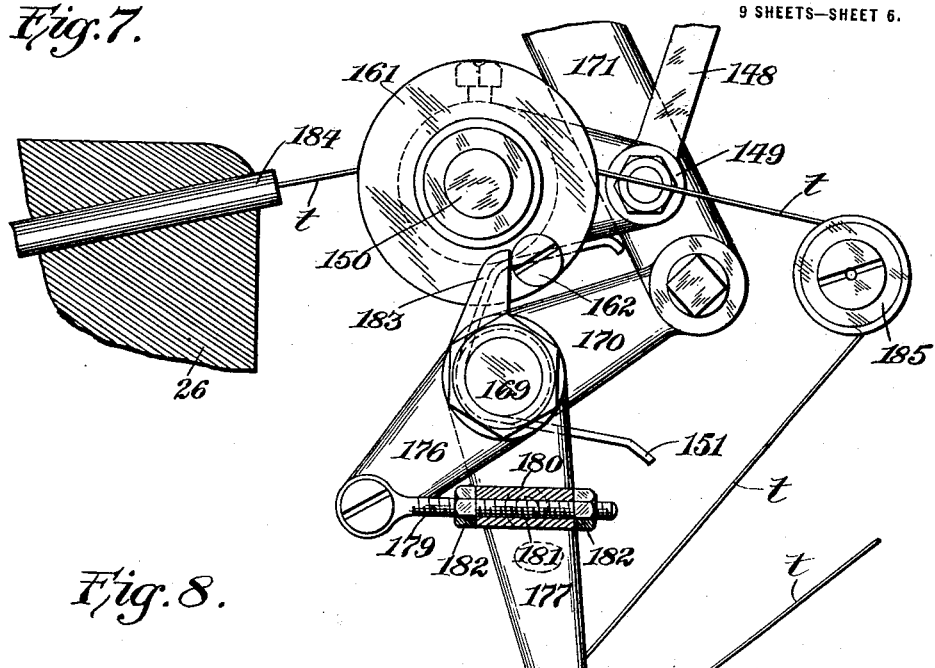
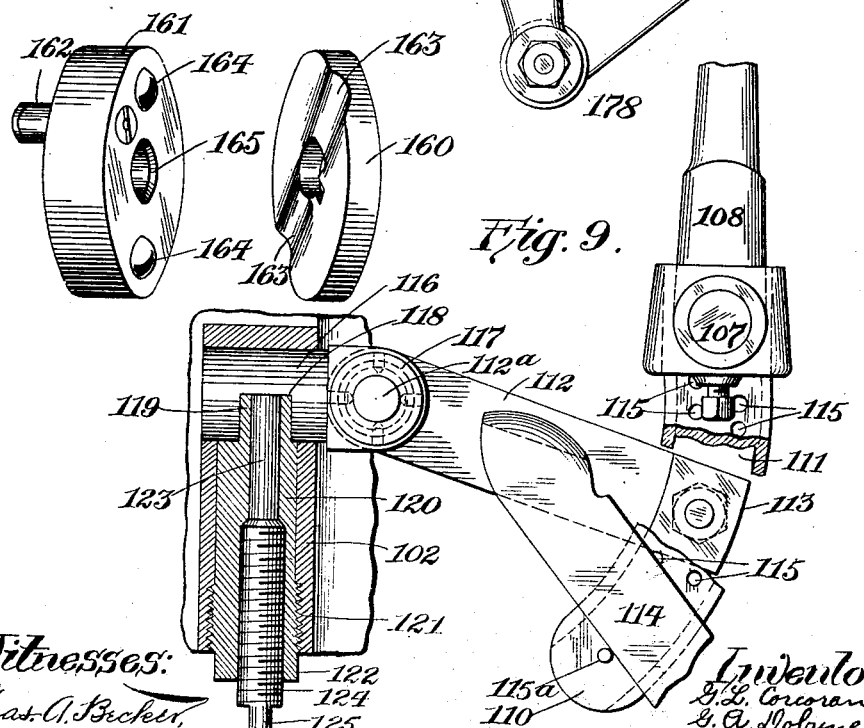

G. L. CORCORAN, G. A. DOBYNE & A. R. SCHOENKY.
SHOE SEWING MACHINE.
APPLICATION FILED JUNE 5, 1911.

1,198,328.

Patented Sept. 12, 1916.
9 SHEETS—SHEET 7.

Witnesses:
Chas. G. S. Becker,
Henry M. Hertel

Inventors:
George L. Corcoran,
George A. Dobyne,
August R. Schoenky,
By John H. Bruninga
Their Attorney.

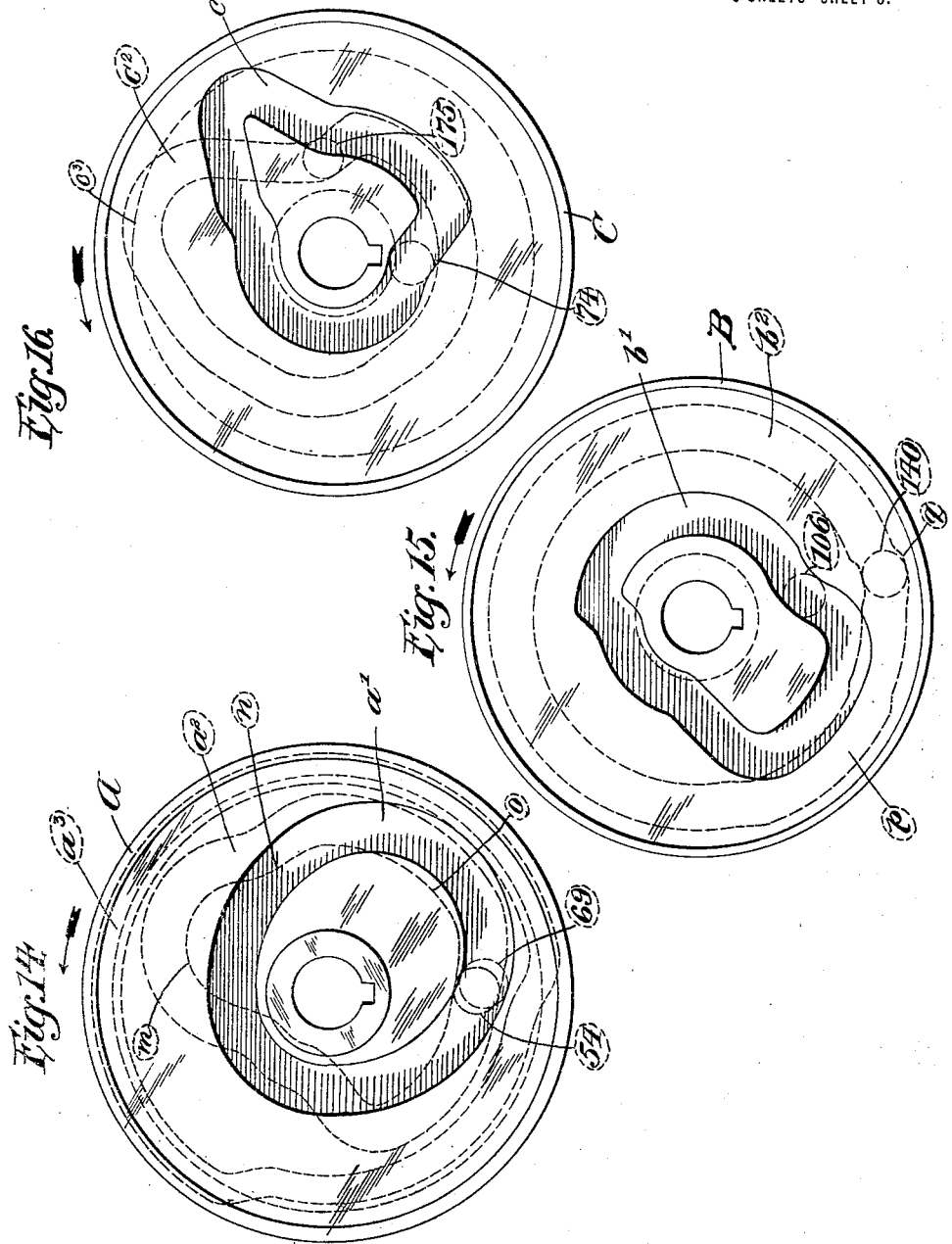

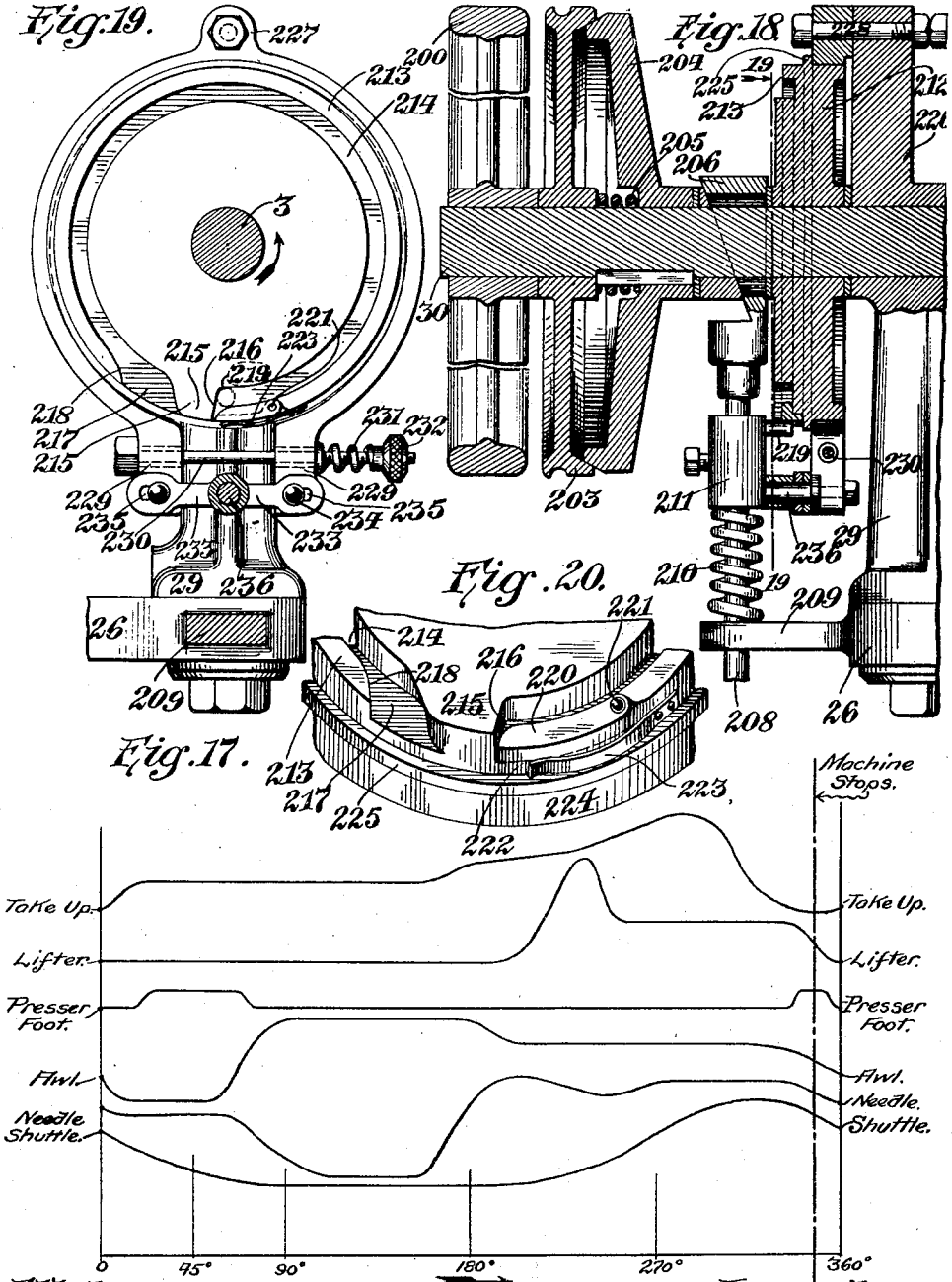

UNITED STATES PATENT OFFICE.

GEORGE L. CORCORAN, GEORGE A. DOBYNE, AND AUGUST R. SCHOENKY, OF ST. LOUIS, MISSOURI, ASSIGNORS TO CHAMPION SHOE MACHINERY COMPANY, OF ST. LOUIS, MISSOURI, A CORPORATION OF MISSOURI.

SHOE-SEWING MACHINE.

1,198,328.

Specification of Letters Patent. Patented Sept. 12, 1916.

Application filed June 5, 1911. Serial No. 631,290.

*To all whom it may concern:*

Be it known that we, GEORGE L. CORCORAN, GEORGE A. DOBYNE, and AUGUST R. SCHOENKY, citizens of the United States, residing at St. Louis, in the State of Missouri, have invented a new and useful Shoe-Sewing Machine, of which the following is a specification.

This invention relates to sole sewing machines of the type shown and described in Patent No. 473,870, April 26, 1892. In the machine shown in the patent, when the parts are in position with the stitch completed the thread-lock is closed so as to lock the thread, and therefore the work cannot be removed at this time. The thread-lock closes a little before the stitch is set, and remains closed until the needle has drawn a loop of thread through the work. In such a machine, in order to remove the work, the operator must stop the machine and then turn it over manually to draw a loop of thread through the work until the thread-lock is opened and then must unhook the thread from the needle when the work can be removed. Such an operation not only requires considerable time, but the work is removed with a stitch only partially completed, leaving an unfilled hole in the work. The presser-foot is locked during the operation of the machine and is unlocked during the feed of the work. It cannot be unlocked by its actuator at the point where the work is removed because at this time the work must be locked to furnish an abutment, as the needle is then pulling a loop of thread through the work. Such a machine must therefore be provided with auxiliary means for lifting the presser-foot at this time. Various means have been proposed and provided for permitting removal of the work, but these means all require a movement of the machine after the completion of the stitch in order to place the instrumentalities in position to release and permit removal of the work.

One of the objects of this invention therefore is to construct a machine in which the instrumentalities and the operating means therefor are so constructed and arranged that these instrumentalities will be in position to permit removal of the work at the completion of the stitch.

Another object is to provide means whereby the machine may be automatically stopped at the completion of the stitch with the parts in the positions stated.

In accordance with this invention the instrumentalities and the actuating means therefor are so constructed that at the completion of the stitch the awl and the needle will be out of the work, the presser-foot will be released, and the thread controlling mechanism will be in a position to release the thread. The thread-lock is so arranged as to be open to release the thread while the take-up is at the limit of its stitch setting stroke. Automatic stopping means are provided to automatically stop the machine at the completion of the stitch when the treadle is released. Indicating means may be provided to indicate when this point is reached whereby the parts may be brought into proper relation by hand.

Another object is to simplify the machine by combining the functions of certain parts, thus dispensing with a number of the parts, and permitting the elements to be arranged in a new relation.

In accordance with this invention the thread controlling mechanism comprises a take-up member and a thread-lock. The take-up member has a two-fold function, namely that of taking up and setting the stitch, and that of a thread measuring means. In the operation of forming a stitch the thread is taken up and set, the lock being closed at this time, and then the lock opens to permit the take-up member to draw thread from the source of supply. The thread-lock is connected with a work engaging member, such as the presser-foot, so that the thread-lock will have a variable action to time the opening of the lock, and thus the amount of thread drawn is in accordance with the thickness of the work. This leaves the thread-lock open at the completion of the stitch to release the thread, and the connection between the lock and the presser-foot permits further opening, for the purpose of removing the work.

Another object is to improve and simplify the operation of the needle and its guide so as to prevent the thread from catching on the needle after it has once been discharged therefrom.

Other objects are to improve the construction of the shuttle, the thread lifter mechanism, and the work feeding mechanism.

Figure 2:
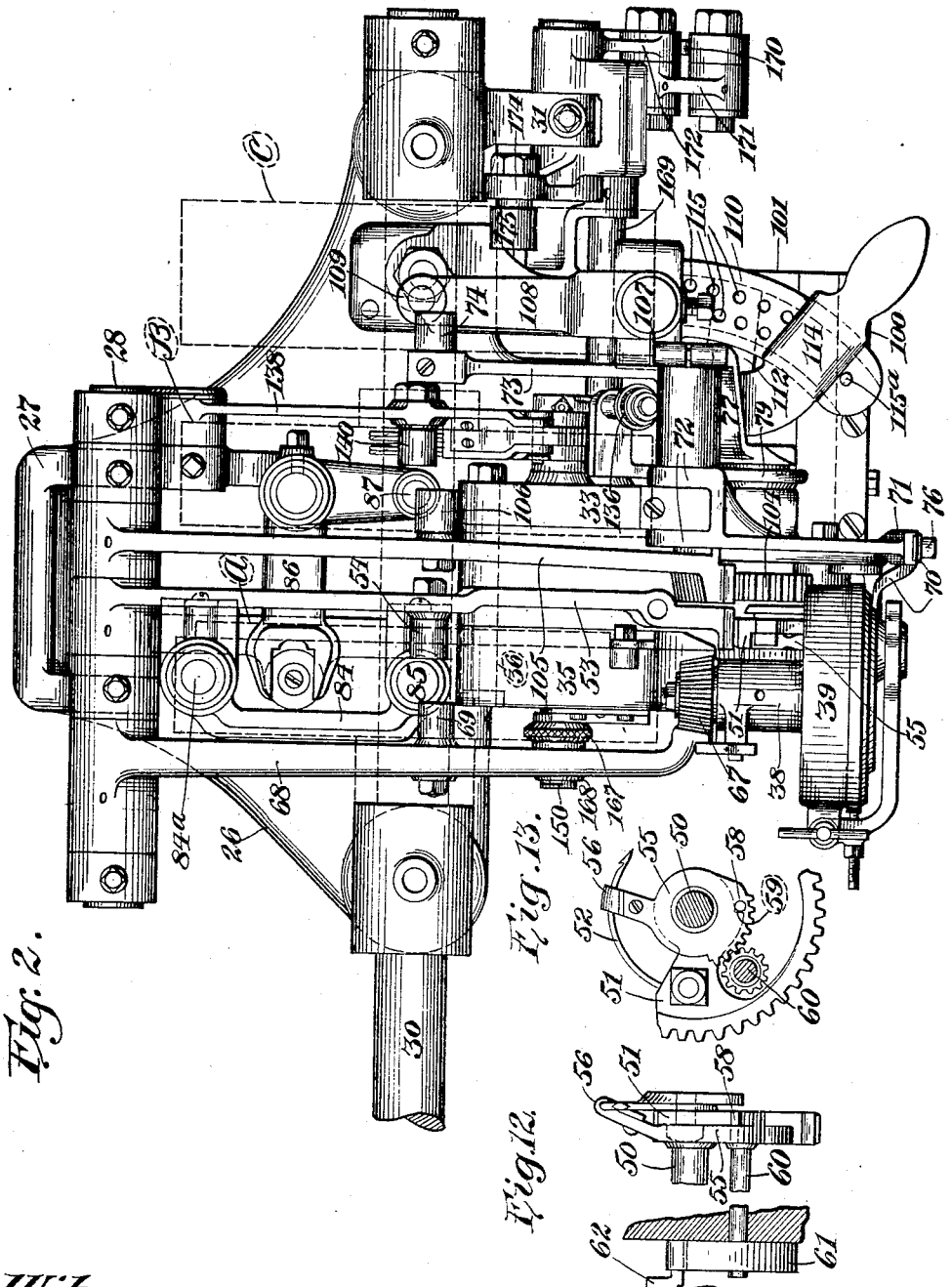
Figure 3:
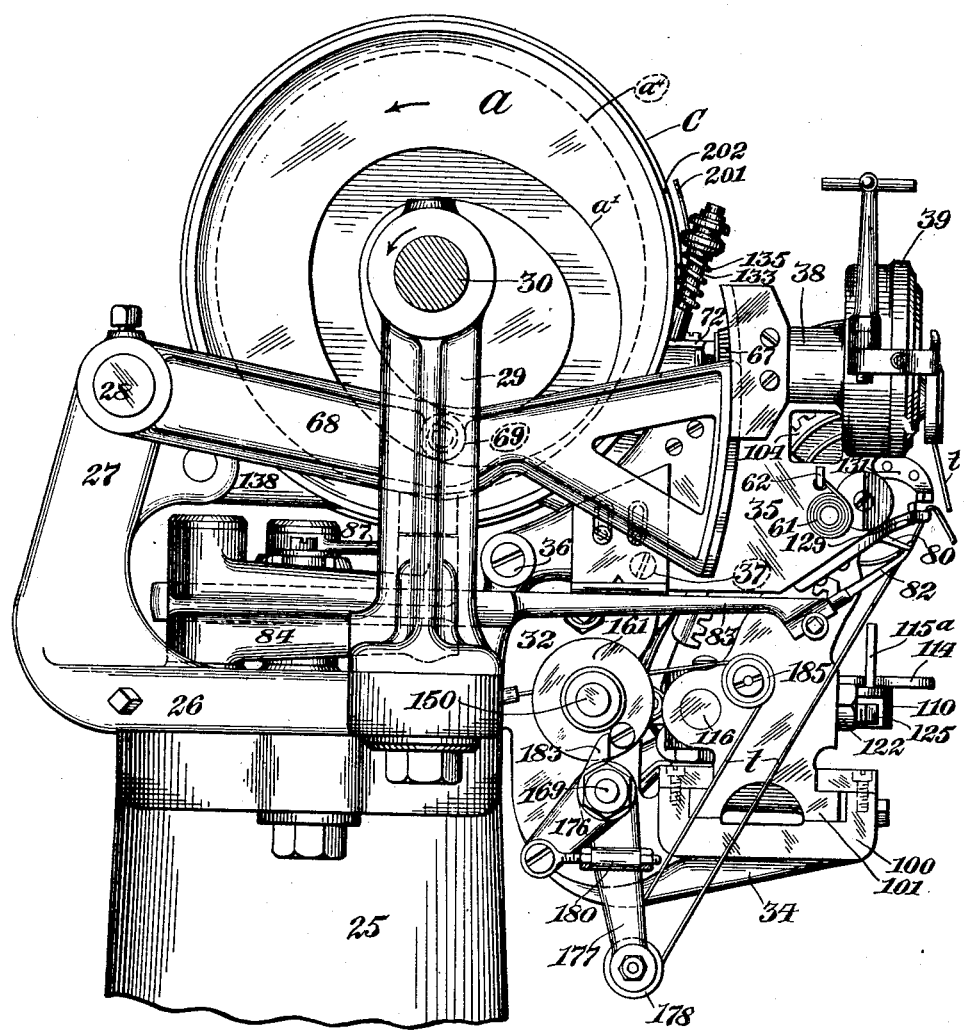
Figure 11:
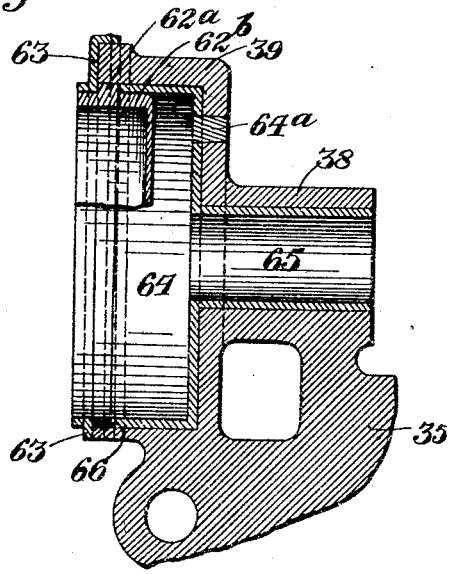
Figure 10:
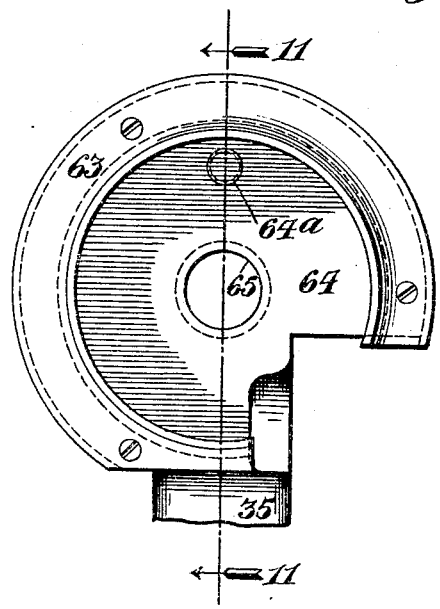

Further objects will appear from the detail description taken in connection with the accompanying drawings in which:

Figure 1 is a front elevation of a sole sewing machine embodying this invention, Fig. 2 is a plan view, the cams being shown dotted, Fig. 3 is a side elevation from the left side of the machine, Fig. 4 is a side elevation from the right side of the machine, Fig. 5 is a detail plan view of the thread controlling mechanism, Fig. 6 is a detail side elevation showing the relation and positions of parts, Fig. 7 is a detail of the thread controlling mechanism, the view being taken from the opposite side of said mechanism, Fig. 8 is a perspective view of the elements of the thread lock, Fig. 9 is a section on the line 9 Fig. 1 showing the work feeding mechanism, Fig. 10 is an elevation, and Fig. 11 is a section on the line 11—11 Fig. 10 showing the shuttle race, Figs. 12 and 13 are detail front and side elevations of the needle and needle guide segments, Figs. 14, 15 and 16 are detail views of the cams, Fig. 17 is a diagram showing the relative positions of the various parts during a complete cycle of operations in the formation of a stitch, Fig. 18 is a vertical longitudinal section through the stopping mechanism, Fig. 19 is a section on the line 19—19 Fig. 18, and Fig. 20 is a detail perspective view of the stopping mechanism.

Referring to the accompanying drawings, 25 designates a column upon which is mounted a head or base 26 having formed thereon a lug 27 provided with bearings for a supporting shaft 28. A pair of brackets 29 are bolted to the head and are provided with bearings for a main driving shaft 30. The right-hand bracket 29 has formed thereon a forwardly extending lug 31 to provide a bearing for the take-up actuating lever. The head 26 has cast integral therewith a lug 32 provided with an upwardly extending portion 33 forming bearings for various mechanisms hereinafter to be described. A forwardly extending lug 34 is also cast integral with the head and provides a support for the awl feed mechanism. A casting 35 is secured to the lug 32 by means of a bolt 36 extending through both parts and a screw 37, the casting and the portion 33 forming together spaced side members as seen in Figs. 1 and 2. The casting 35 has cast integral therewith the bearing 38 for the shuttle actuator shaft and the shuttle race 39. A bracket 40 is bolted to the head 26 and is provided with an arm 42 forming a bearing for the take-up shaft, and with a forwardly extending arm 43 forming a bearing for the feed slide actuating lever.

The main drive shaft 30 has keyed thereto three cam wheels A, B and C. These cam wheels are shown in detail in Figs. 14, 15 and 16 in the same relative positions which they occupy on the drive shaft and in the position when the machine comes to rest, at which time the key on the shaft is in its lower vertical position. The cam A is provided with four cam grooves $a'$, $a^2$, $a^3$ and $a^4$ adapted to actuate the shuttle, the needle, the thread holder, and the looper respectively. The cam B is provided with three cam grooves $b'$, $b^2$ and $b^3$ adapted to actuate the awl, the presser-foot, and the looper respectively. The cam C is provided with three cam grooves $c'$, $c^2$ and $c^3$ adapted to actuate the thread lifter, the take-up, and the feed slide respectively. In Figs. 14, 15 and 16 the cam rolls are shown in the positions they occupy in their respective cam grooves when the machine comes to rest.

Fig. 17 is a diagram showing the relative positions and movements of the shuttle, the needle, the awl, the presser-foot, the thread lifter or spreader, and the take-up during a complete cycle of operations during the formation of a stitch. The motion is in the direction of the arrow, and the vertical lines show the various angular positions of the drive shaft and the cams thereon, the 0° position being taken as the position of the key and keyways for the first five members, and 90° from the key in the direction of rotation for the take-up. The position at which the stitch is completed and at which the machine stops is indicated on the diagram by the line "Machine stops". The downward movements on the diagram designate the following motions: shuttle, thread taking movement; needle, piercing movement; awl, piercing movement; presser-foot, clamping movement; lifter, downward movement; take-up, thread giving movement.

*The stitch forming mechanism.*—Referring to Figs. 1 to 4 inclusive and 12 and 13, a stub shaft 50 is mounted in the casting 35 and supports the needle and the needle guide segments 51 and 55 for oscillating movement thereon. A curved hook needle 52 is clamped in the needle segment and extends through the guide 56. The needle segment is provided with gear teeth meshing with corresponding teeth on a needle actuating lever 53 pivoted on the shaft 28 and provided with a cam roll 54 engaging the cam groove $a^2$. The needle guide segment 55 is provided with a pin 58 adapted to be engaged by a shoulder 59 on the needle segment, and with teeth meshing with a gear on a shaft 60 mounted in the casting 35. A spring 61 secured at one end to the shaft 60 and at its other end to a pin 62 holds the pin 58 in engagement with the shoulder 59 and holds the guide yieldingly on the upper face of the work when the needle is in the work.

Referring to Figs. 1 to 4 inclusive and 10 and 11, the shuttle casing or race is shown as cast integral with the casting 35. The shuttle $62^b$ is of the usual oscillating construction and is provided with an annular flange $62^a$. A cap plate 63 is screwed to the casing and operates to retain the shuttle in position. The shuttle race is provided with a liner composed of a section 64 for the shuttle race proper, and of a shank 65 for the shuttle actuator shaft. This liner forms a shoulder 66 adapted to engage one face of the flange $62^a$, and the cap plate 63 is arranged to retain both the shuttle and the liner in position, the liner being kept from rotating by a dowel $64^a$. The shuttle actuator shaft is provided with a bevel gear 67 adapted to mesh with a segmental rack on the shuttle actuating lever 68 which is pivoted on the shaft 28 and provided with a cam roll 69 adapted to engage the cam groove $a'$. By providing the shuttle race with the removable liner it is necessary to replace only this liner when the shuttle race wears down, and it is not necessary to replace the entire casting 35. At the same time the liner and cap plate 63 furnish cooperating shoulders forming bearings for the shuttle.

The thread lifter 70 is mounted upon the arm 71 of an actuating lever which is pivoted upon a shaft 78 supported at one end in the lug 33 and at the other end in a bracket 77 connecting the shaft 78 with a shaft 79. The actuating lever is provided with ears 72 which embrace the lug 33, and with a rearwardly extending arm 73 provided with a cam roll 74 engaging the cam groove $c'$. The flat shank 75 of the lifter is adjustably mounted in a guide or groove cut in the forward end of the arm 71, and is slotted to receive a clamping screw 76. By means of this construction the lifter can be adjusted vertically in its actuator, and such adjustment will not throw it out of alinement, since the flat shank and the guide groove will guide it in its movements.

The thread holder and the looper are of substantially the same construction as shown in said patent. The thread holder 80 is guided in ways in the casting 35 and is provided with a cam roll engaging the cam groove $a^3$. The looper 82 is mounted in a looper bar 83 guided in a carrier 84 which is mounted for swinging movement in a horizontal plane upon a vertical pivot $84^a$ on the head 26. The looper bar is reciprocated in its carrier by means of an actuating lever 86 pivoted upon the head and provided with a cam roll 87 engaging the cam groove $a^4$. Since the thread holder and looper are of the same construction as that shown in the patent, further detailed description of their construction or operation will be unnecessary.

The operation of the needle is different from that of the patent. In the patented construction the needle guide is actuated positively in both directions, and this guide is moved forward and the needle backward so that the guide will cover the hook of the needle after the thread is discharged therefrom. In accordance with this invention the rise $m$ of the cam groove $a^2$ (Fig. 14) causes the needle to draw a loop of thread through the work; as the thread is taken by the lifter and the shuttle, the cam portion $n$ causes the needle to move forward for a short distance so as to completely discharge the thread from the hook, and thereafter the cam portion $o$ causes the needle to be drawn back completely and out of the way so as to prevent catching of the thread on the hook. This operation of the needle with respect to the shuttle and lifter is well illustrated in the diagram Fig. 17. The thread guide is moved toward the work by means of spring 61 and lifted away from the work by the needle guide. This construction therefore results in simplification of parts, since it dispenses with a separate cam groove and actuator for the thread guide.

*The work feeding awl mechanism.*—Referring to Figs. 1 to 4 inclusive and Fig. 9, the forwardly extending lug 34 forms a guide 100 for a feed slide 101. This feed slide carries a post 102 forming an adjustable support for the awl and its carrier or segment. The awl 103 is clamped in the awl segment 104 which is loosely mounted for oscillating movement upon a stub shaft in the upper end of the post. The awl segment is provided with gear teeth meshing with a segmental rack on the awl actuating lever 105 which is pivoted upon the shaft 28 and is provided with a cam roll 106 engaging the cam groove $b'$.

An actuating lever is pivoted upon a shaft 107 mounted in the arm 43, and one arm 108 of this lever is provided with a cam roll 109 engaging the cam groove $c^3$, while the other arm 110 is provided with a guideway 111. A link 112 is pivotally connected to the post 102 by a pivot bolt $112^a$ and is provided at its other end with a block 113 engaging the guideway 111. The guideway 111 is cut on the arc of a circle having the pivot $112^a$ as its center so as to prevent shifting of the awl out of alinement with the needle when the block 113 is adjusted in the guide way. The guideway 111 is cut in the lower face of th arm 110, and the upper face of the link therefore bears against the lower face of the arm. An arm 114 is secured to and preferably formed integral with the link 112 and is spaced therefrom so as to extend over the upper face of the arm 110, and forms a handle by means of which the block 113 may be shifted in the guideway. This arm is displaced with respect to the link so that the block may be moved from the pivot of the actuating lever and beyond. This construction is advantageous, since it permits the feed of the work to be adjusted from practically zero to a maximum. If the arm 114 were in alinement with the link, then it would be impossible to move the block near the center of the actuating lever, since the edge of the arm would engage the pivotal support or bearing for the actuating lever before the block would reach the pivot. However by displacing the arm with respect to the link, this block can be moved up to the very center of the lever so that the feed can be adjusted to practically zero. The link 112 and the arm connected thereto embrace the lever so as to form a snug fit, and the upper face of the lever is provided with a plurality of holes 115 adapted to receive stop pins 115ª for locating the arm 114 and the link to which it is connected.

The pivot bolt 112ª passes through a cylindrical block 116 which is mounted for sliding movement in the post 102 and the link is locked on the pivot by means of lock nuts 117. The cylindrical block is provided with a vertical guideway 118 with which coöperates the pin 119 of an eccentric 120 rotatably mounted in the post 102. A part of the eccentric shank is threaded at 121 and the post is correspondingly tapped to secure the eccentric in position in the post. The eccentric is provided with a hexagonal head 122 so that it may be engaged by a wrench and be turned. The eccentric is bored axially to receive a locking pin 123 which is threaded at 124 into the eccentric and is provided with an angular head 125 adapted to be engaged by a wrench. The block may be moved in the post by turning the eccentric, and may be locked in position by means of the locking pin 123, this locking pin engaging the bottom of the guide in the block so as to firmly clamp the eccentric and the block in adjusted position in their bearing in the post. By means of this construction the awl may be adjusted to aline it with the needle, and in view of the eccentric connection this adjustment can be made exceedingly accurate and fine. The heads 122 and 125 extend to the front of the machine so as to be readily accessible from the front of the machine.

*The presser-foot mechanism.* — Referring to Figs. 1 to 6 inclusive, a work support 129 is mounted upon the casting 35 and is provided with an oblong slot for the awl and needle, and with a lug 130 forming a gage for the edge of the sole. The presser-foot 131 is pivotally mounted upon the shaft 79 supported at one end of the lug 32 and at the other end in the bracket 77, and this presser-foot has a rearwardly extending arm 132 rigidly connected thereto. An arm 133 is loosely mounted upon the shaft 79 and is yieldingly connected to the arm 132 by means of a link 134, a spring 135 and an adjusting nut as in said patent. The arm 133 is provided with a rack or ratchet 136 adapted to be engaged by a pawl or dog 137 mounted upon an actuating lever 138 pivoted at its rear end on the head 26. A spring 139 bears on the dog and throws it into engagement with the rack and the actuating lever is provided with a cam roll 140 engaging the cam groove $b^2$. The arm 132 is also provided with a rack 141 adapted to be engaged by a dog 142 which is held in engagement therewith by means of a spring 143. A fixed pin 144 on the lug 32 is adapted to be engaged by the dog 137 so as to throw it out of engagement with the rack 136 when the actuating lever 138 is moved to its lowered position. The lever 138 is provided with a heel 145 adapted to engage the tail-piece 146 on the dog 142 to throw it out of engagement with the rack 141. In this way both dogs are thrown out of engagement with their racks when the actuating lever is moved to lowered position by its cam. A link 148 connects the arm 132 with an arm 149 on a shaft 150, and a comparatively light spring 151 bearing at one end on the guideway 100 and at its other end against the lower face of the arm 149 tends to rotate the shaft 150 clockwise, and thus the spring acting through the linkage connection 148 with the arm 132 holds the presser-foot with a light pressure on the work. A link or rod 147 connects the arm 132 with the treadle so that the presser-foot may be raised manually.

In the operation of this presser-foot mechanism as in said patent the presser-foot is held on the work under increased pressure and locked in position, except that during the feeding operation the presser-foot is unlocked and the increased pressure released so that the presser-foot will be only under the tension of the light spring 151 during such feeding operation. This is accomplished by the cam groove $b^2$ which raises the lever 138 so that the dog 137 will engage the rack 136 and force the presser-foot on the work against the tension of the strong spring 135, while the dog will lock the presser-foot under such increased pressure. During the feeding operation however the portion $p$ of the cam groove $b'$ (Fig. 15) comes into action and throws the actuator lever down to the position shown in Fig. 6, so as to unlock and release the presser-foot. In accordance with this invention however the presser-foot is not only released during the feeding movement, but also when the machine comes to rest. For this purpose the cam groove $b'$ is provided with a short portion $q$ adapted to drop the actuating lever 138 to the position shown in Fig. 6, so as to unlock and release the presser-foot and permit it to be raised from the work by the treadle. This release takes place at the completion of the stitch as will be seen from Fig. 17. During the operation of the machine the release of the presser-foot at the completion of the stitch is not detrimental, since the release is only of very short duration, due to the short length of the cam portion $q$.

*The thread controlling mechanism.*—The thread controlling mechanism consists of a take-up member and a coöperating thread-lock. The take-up member has a two-fold function, namely to take-up and set the stitch, and to draw thread from the supply. The thread-lock is arranged to lock or clamp the thread while the take-up member operates to take up the thread and set the stitch, and the thread-lock opens thereafter during the latter part of the movement of the take-up member to permit said member to draw thread from the source of supply.

Referring to Figs. 1 to 8 inclusive the shaft 150 extends through the lug 32 and has keyed thereto one of the members or elements 160 of the thread-lock. The coöperating member or element 161 of the thread-lock is loosely mounted upon the shaft 150 so as to be capable of angular displacement with respect to the member 160, and is provided with a roll 162 adapted to be engaged by a toe on the take-up member as hereinafter described. The lock member 160 is provided with a cam groove 163 extending across its face and the lock member 161 is provided with cam projections 164 adapted to coöperate with the groove 163. The projections 164 consist of steel balls loosely mounted in substantially semi-spherical cavities in the member 161, the cavities being slightly deeper than the radii of the balls, and the edges of the cavities being peened over to hold the balls loosely in place. The inside face of the member 161 is beveled at 165 adjacent to shaft 150 so as to prevent binding or cutting of the thread. The members 160 and 161 are placed in coöperative relation on the shaft 150 with the balls 164 in the groove 163, and a spring 166 bearing at one end against the member 161 and at the other end against a nut 167 is arranged to hold the members in yielding engagement. The tension of the spring may be adjusted by means of the nut 167 which is provided with a lock-nut 168. The groove 163 has its edges beveled as shown in Fig. 8 so as to permit the balls to ride easily on the cam portion. If one of the lock members is rotated with relation to the other, the balls will ride up on the faces of the cam groove so as to separate the thread engaging faces a distance depending upon the angular displacement of these lock members. If these lock members are freed, the spring 166 will tend to move the balls down the inclines of the cam groove to their lowest position, and thus throw the lock members together. The cam groove is of such a depth that when the balls are in position therein, the locking member faces will be in clamping engagement to clamp the thread. It will thus be seen that a rotation or angular movement of the lock member 161 on the shaft 150 will move the lock member 161 away from the lock member 162 against the tension of the spring 166, and that the spring will return them into engagement.

A take-up shaft 169 is supported in bearings in the lug 32 and in the bracket 42. This shaft has secured thereto an arm 170 which is connected by a link 171 with an arm 172 of an actuator lever mounted upon a shaft 173 in the lug 31. The other arm 174 of this lever is provided with a cam roll 175 engaging the cam groove $c^2$. An arm 176 is rigidly secured to the take-up shaft 169 to move therewith, and a take-up arm or member 177 provided at its end with a thread roll or pulley 178 is loosely mounted on the take-up shaft. A threaded link 179 is pivotally connected at one end to the arm 176 and passes through a trunnion member 180 pivotally connected to the take-up arm at 181. The link passes loosely through the trunnion member and is provided with nuts 182 arranged to adjustably connect the link with the trunnion member and lock it in position after it is adjusted. The take-up arm 177 is provided with a toe 183 which is adapted to engage the roll 162 on the lock member 161. The thread $t$ passes from the source of supply through a suitable tension device (not shown), through the wax pot, through a tube 184, between the lock members, over a loose guide pulley 185, over the pulley 178 on the take-up arm, through the eye in the looper, and through the slot in the work support 129. The pulley 185 is provided with a bridge $185^a$ (Fig. 5) to hold the thread in place.

The operation of the thread controlling mechanism is as follows: After a loop of thread is on the shuttle and ready to be discharged therefrom, the take-up cam groove $c^2$ will through its connections operate the take-up arm 177 so as to move it down and take up the thread. At the beginning of the take-up movement the take-up arm will be raised from the position shown in the drawings, and the toe 183 will be out of engagement with the roll 162 so that the spring 166 will clamp the lock members together to firmly lock or clamp the thread. The thread will thus be clamped at a point between the take-up arm and the source of supply, and will remain clamped or locked while the take-up arm takes up the thread and also while it sets the stitch. Near the limit of the stroke of the take-up arm, and after the stitch has been set, the toe 183 will engage the roll 162 and further movement of the take-up arm will cause the toe to rotate the lock member 161 counter-clockwise and spread the lock members apart in the manner hereinbefore described so as to release or unclamp the thread. The thread being thus released, the take-up arm will operate during the last part of its stroke to draw or measure thread for the next stitch from the source of supply. At the limit of the stroke of the take-up arm the thread-lock will be opened to release the thread. As the take-up arm starts to move back, the toe will in the first part of its movement move out of engagement with the roll on the lock member and thus the spring 166 will operate to move this lock member 160 back in position to clamp the thread. In referring to Fig. 17 it will be seen that the take-up arm is given two preliminary movements during the first part of the cycle of operations of forming a stitch. The first movement is for the purpose of releasing the locking member 161 so as to clamp the thread and for the purpose of relieving the tension of the thread, and the purpose of the second movement is to give up thread to the looper. The third or final movement is the one in which the thread is given up to the shuttle.

It will thus be seen that the take-up arm performs the double function of taking up and setting the stitch, and of drawing or measuring thread from the source of supply. Different thicknesses of stock however require different amounts of measured thread, and means must be provided for varying the amount of measured thread in accordance with the thickness of the stock. This is accomplished as follows: It will be noted that the take-up arm engages the roll 162 in the latter part of its stroke, and that the take-up arm moves through a fixed arc and to a fixed limit during its take-up and thread drawing stroke. It will therefore be seen that if the take-up member could be made to engage the roll earlier or later in its stroke it would open the lock earlier or later and thus the thread drawing movement of the take-up arm would be increased or decreased. This can be accomplished by moving the take-up engaging portion of the lock with respect to the take-up arm. The shaft 150 and the lock member 160 keyed thereto are connected to the presser-foot through the lever and link connections 149, 148, 132. Since the work support 129 is rigid, the movable work engaging member or presser-foot 131 will vary in its position in accordance with the thickness of the work, and thus the lock member 160 connected to the presser-foot will vary in its position in accordance with the thickness of the work. Since the lock member 161 is normally connected to and movable with the lock member 160, this lock member and the roll 162 connected therewith will vary in position with respect to the toe 183 in accordance with the thickness of the work. Thus as the thickness of the work increases the shaft 150 and the roll 162 movable therewith will be moved in a clockwise direction so as to move the roll 162 to the left Figs. 3 and 7, toward the toe 183. In this way the roll 162 will be engaged by the toe 183 earlier in the movement of the take-up arm so that the thread-lock will be opened earlier and thus the thread drawing movement of the take-up arm will be increased. A decrease in the thickness of the stock will have the reverse effect.

It will therefore be seen that in accordance with this invention the thread is measured automatically in accordance with the thickness of the work so that the lock will be drawn a uniform distance from the surface of the work, irrespective of its thickness. This is accomplished by varying the thread drawing action of the take-up mechanism, and by giving the thread-lock a variable action so as to release the thread at a variable point. In order to adjust the mechanism independent of its automatic means, such for instance as for preliminary adjustments or for different lengths of stitches, the take-up arm 177 can be adjusted by lengthening and shortening the link, thereby independently adjusting the take-up arm with respect to the thread-lock.

*The stopping mechanism.*—The machine is provided with means for stopping it in a predetermined position. Referring to Figs. 1 to 4 inclusive and 18 to 20 inclusive, 200 designates a handwheel mounted on the left-hand end of the drive shaft 30 so that the machine may be turned over by hand. An indicating device or pointer 201 is mounted on the bracket 77 and the cam wheel C is provided with a corresponding mark 202 so that when the mark alines with the pointer the machine will be in proper position with the sewing instrumentalities at the completion of the stitch as hereinafter described.

A loose pulley 203 is mounted upon the shaft 30 and is provided with a belt groove and with a cone face adapted to coöperate with a cone face on a sliding clutch member 204, which is splined on the shaft 30 and moved out of engagement with the pulley by means of a spring 205, and is thrown into engagement by a wedge 206 upon the clutch rod 208. The clutch rod is guided in a bearing lug 209 extending from the head 26, and a spring 210 is mounted upon this rod between the lug 209 and a sleeve 211 secured to the clutch rod so that the spring will normally tend to move the clutch rod and the sleeve and wedge connected thereto to elevated position to disconnect the clutch member from the pulley. A wheel 212 is keyed to the shaft 30 so as to move therewith. This wheel is provided with a rim 213 and with an annular groove 214. The rim and groove extend nearly around the wheel and terminate in a bridge 215 forming a shoulder 216. The rim 213 is cut away rearwardly of the bridge 215 to form an open port 217 and the inner face of the rim is curved at this point to form a cam portion 218. A pin 219 on the sleeve 211 is arranged to extend over the rim 213 so as to bear against the same when the clutch rod is released, and as the shaft rotates in the direction of the arrow Fig. 19 is arranged to enter the cut away portion 217 and be struck by the shoulder 216 as shown. A part in the rim 213 adjacent and in front of the shoulder 216 is movable to form a pivotal member 220 pivoted at 221 on the wheel and provided with a portion 222 adapted to abut against the bottom of a cut away recess in the wheel so as to limit the inward movement of 220. A leaf spring 223 secured to the wheel and bearing upon the part 222 of the pivotal member is arranged to hold the pivotal member in the position shown.

The wheel 212 is provided with a brake surface 224 separated from the rim 213 by means of a flange 225. The bracket 29 has formed thereon a lug 226 adapted to support a brake band 227, the brake band being pivotally mounted upon this lug by means of a bolt 228. The ends 229 of the brake band are connected by means of a tie bolt 230, and the brake band is normally contracted by means of a spring 231 on the tie bolt bearing at one end against the end of the brake band and at the other end against an adjustable nut 232. A pair of links 233 are pivotally connected with the ends of the brake band to form a toggle joint, the connection to the brake band being made by pin and slot connections 234, 235, while the center joint of the toggle is formed by a pin 236 on the sleeve 211.

The operation of this mechanism is as follows: When the treadle is depressed the clutch rod 208 and the wedge 206 and the sleeve connected therewith will be lowered against the tension of the spring 210 so as to throw the clutch member 204 into engagement with the belt pulley to start the machine. This will move the parts to position shown in Figs. 18 and 19 with the pin separated a slight distance from the rim 213 and with the toggle links straightened so as to expand the brake band against the tension of the spring 231. If the treadle be now released for the purpose of stopping the machine, the spring 210 will force the clutch rod and the sleeve 211 connected therewith upwardly so as to cause the pin 219 to bear against the rim 213. The pin will bear against the rim and ride over the same including the pivotal member 220, (the spring 223 being narrow enough to clear the pin as shown in Fig. 18) until the cut away portion reaches the pin. The spring 20 will then cause the pin to snap into the groove 214, the cam portion 218 assisting in throwing the pin into the groove if the parts should stick. As soon as the pin snaps into the groove and is moved upwardly, the wedge 206 will also move upwardly so as to disconnect the clutch member, and at the same time the upward movement of the pin 236 will break the toggle 233 so as to permit the spring 231 to contract the brake band and apply the brake. The pin and slot connections between the toggle members and the brake band permit the spring to perform its braking action unimpeded. It will therefore be seen that as the pin 219 enters the groove 214 the clutch will be disconnected and the brake band applied to brake the machine against the momentum of its moving parts, and the egagement of the pin 219 with the shoulder 216 will positively arrest the machine in a predetermined position as shown in Fig. 19. When the machine is again to be started, the treadle is depressed to lower the treadle rod 208 when the pin 219 will snap past the pivotal member and the brake will be thrown out of action. It will therefore be seen that this stopping mechanism is constructed to stop the machine in a predetermined position, and that the brake is applied before the positive stop comes into action so as to slow down the machine and prevent shock. It will also be seen that the brake is applied in every case during a constant period, i. e., for practically a full revolution of the shaft.

*Summary of operation.*—The main shaft 30 rotates in the direction of the arrow Fig. 3. Referring to the drawings and particularly to the diagram Fig. 17, the automatic mechanism is arranged to stop the machine with the parts or instrumentalities in position to permit removal of the work. The presser-foot is at this time released and it may be raised by the presser-foot treadle so as to permit the sole to be placed in position on the work support 129, and if the presser-foot treadle is now released, the work will be clamped against the work support by the tension of the light spring 151. The machine can now be started by depressing the clutch treadle and the operation will be as follows: The presser-foot actuating lever will immediately be actuated by leaving the portion $q$ of the presser-foot cam groove $b^2$ to apply the increased tension on the presser-foot and to lock the presser-foot under such increased tension. It will be noted that the cam portion $q$ is relatively short so that the presser-foot actuating lever will be operated immediately after the machine is started, to apply the increased pressure and to lock the presser-foot under such increased pressure. The awl moves upwardly and the needle lifter and shuttle also move for clearance purposes and to place the shuttle in position to take the loop. At the time the awl will be ready to penetrate the work, the presser-foot will have been placed and locked under increased tension so as to furnish a rigid abutment against the piercing action of the awl. After the awl has reached the limit of its piercing stroke, the feed slide is moved to the left to feed the work. Before the feed commences however, the presser-foot is released by the cam portion $p$ so as to permit the awl and the work to slide between the presser-foot and the work support, both the presser-foot and the work support being stationary in this machine. After the slide has moved to the left, and when the awl is in alinement with the needle, the awl is withdrawn and is followed by the needle, and the increased pressure is applied to the presser-foot and it is locked after such increased pressure has been applied. The feed slide is then moved back to the right to original position. Meanwhile the looper and the thread holder have been operated to place the thread in position, and the take-up member has moved upwardly a slight distance to relieve the tension and close the thread-lock, and when the needle is in its lowest position the thread is placed around the needle hook. The needle now moves upwardly to draw a loop of thread through the work, the take-up member moving upwardly and giving up its thread, and the thread is taken by the lifter or spreader and placed on the shuttle which begins to move to take the thread. As the thread is delivered to the shuttle, the needle moves forwardly a slight distance to disengage its hook completely from the thread, and thereafter backwardly to the limit of its backward stroke so as to move or back it completely out of the way of the thread in order to prevent the thread from catching on the needle after it is once discharged therefrom. After the loop is on the shuttle and ready to be discharged therefrom, the take-up member moves down to take up and set the stitch, the thread-lock being closed to lock or clamp the thread during this take-up and stitch setting movement of the take-up member. During the latter part of the stroke of the take-up member, the lock is moved to permit the take-up member to draw thread from the supply, the amount of thread drawn or measured varying automatically in accordance with the thickness of the stock. This cycle of operations completes a stitch.

By referring to Fig. 17 it will be noted that at the completion of the stitch, which is indicated by the line designated "Machine stops", all the parts are in position to permit removal of the work. The take-up member is down to its lowest limit and consequently the thread-lock is open to release the thread; the presser-foot is released so as to permit it to be raised; and the awl and needle are out of the work (it being remembered that the awl and needle have an idle movement for clearance before they enter the work). It will be noted therefore that the work can be removed at the completion of the stitch, and it is unnecessary to partially complete another stitch or to back up the machine after the completion of the stitch in order to permit the removal of the work. This obviously has great advantages.

The machine can be provided with indicating means designated by 201 and 202, whereby the operator may position the parts manually by turning the hand wheel 200, the machine being provided with an ordinary clutch, it being remembered that when the indicating parts 201 and 202 coincide, the machine parts will be in position at the completion of the stitch, and at such a point the work may be removed. The machine is however preferably provided with automatic stopping mechanism for automatically stopping the machine at this point, such mechanism being shown in Figs. 18, 19 and 20 and hereinbefore described. With such a construction after the treadle is released the machine will be stopped automatically at the completion of the stitch, and the parts will then be in position to permit the removal of the work. The operator may therefore remove the work without releasing his hold on the shoe, since it is merely necessary for him to release the clutch treadle and thereafter depress the presser-foot treadle so that the work can be removed, the treadles being preferably placed close together and side by side. By raising the presser-foot, the thread-lock, (being at this time open to release the thread) will be further opened, due to its connection with the presser-foot, so that the thread will be completely released. When the machine comes to a stop and the work has been removed, the machine is in position to receive a new piece of work without requiring repositioning of the parts as in prior constructions. It is only necessary for the operator to raise the presser-foot by the treadle, which leaves both of his hands free for the manipulation of the work, and he can then start the machine by simply depressing the clutch treadle, when the machine will start at the beginning of a stitch. It will thus be seen that in accordance with this invention a large amount of time will be saved by cutting down to a minimum the time required to remove and position the work. Since the machine is stopped at the completion of the stitch no unfilled hole will be left in the work, but the last stitch will be completed.

The machine is very much simplified and the number of parts have been very much reduced, as compared with prior constructions, by condensing certain of the mechanisms and by combining the functions of others. Thus the take-up and thread-lock are constructed so as to perform the functions of a thread measuring mechanism, the lock itself is operated by the take-up, and a simple actuator shaft and cam groove are provided for the take-up member the lock and the thread measuring means. The automatic adjustment of the thread measuring means in accordance with the thickness of the stock is accomplished by a simple direct connection between the thread-lock and the presser-foot. The entire mechanism is therefore operated through the medium of three cam wheels. The invention therefore results in a machine having all the functions of the prior complicated constructions with a decreased number of moving parts, and the resultant stitch obtained by this construction is very much more accurate than in the prior constructions, since the thread is always locked until the stitch has been set, thus enabling the lock to be set a uniform distance from the face of the work.

The work feed mechanism and the thread controlling mechanism are not claimed in this application, but in copending applications, Serial Nos. 638,024 and 638,026, filed July 11, 1911, since become patents numbered 1,134,035 and 1,032,303, respectively.

It is obvious that various changes may be made in the details of construction without departing from this invention, and it is therefore to be understood that this invention is not to be limited to the specific construction shown and described.

Having thus described the invention what is claimed is:

1. In a sole sewing machine, the combination of a work support, a presser-foot, an awl, a needle, a shuttle, thread controlling mechanism including a thread-lock, and operating means including a drive shaft, constructed to be stopped, while moving in normal operating direction, with the stitch completed, with the awl and needle out of the work, and with the thread controlling mechanism in position to release the thread, so as to permit removal of the work.

2. In a sole sewing machine, the combination of a work support, a presser-foot having locking means, an awl, a needle, a shuttle, thread controlling mechanism, and operating means, including a drive shaft, constructed to be stopped, while moving in normal operating direction, with the stitch completed, with the awl and needle out of the work, with the presser-foot released, and with the thread controlling mechanism in position to release the thread, so as to permit removal of the work.

3. In a sole sewing machine, the combination of stitch forming mechanism including a needle, an awl, thread controlling mechanism including a thread-lock, a work support, a movable presser-foot, means to force the presser-foot against the work on the work support and to lock said presser-foot, and operating means, including a drive shaft, constructed to be stopped while moving in normal operating direction, with the stitch completed, with the awl and needle out of the work, with the presser-foot unlocked and with the thread-lock open and the thread released to permit removal of the work.

4. In a sole sewing machine, the combination of stitch forming mechanism including a needle, thread controlling mechanism including a thread-lock, a work support, a movable presser-foot, means to force said presser-foot against the work on the work support with a normally light pressure, means to increase said pressure at intervals and to lock said presser-foot when the pressure has been increased, and means whereby the machine may be stopped while moving in normal operative direction, at the time when the stitch forming mechanism has completed the stitch, with the awl and needle out of the work with the presser-foot released and with the thread-lock open to permit removal of the work.

5. In a sole sewing machine, the combination of a work support, a presser-foot, an awl, a needle, a shuttle, thread controlling mechanism including a thread-lock, actuating means for said members, including a drive shaft, and stopping mechanism adapted to automatically arrest the parts, while the shaft is moving in normal operative direction with the stitch completed, with the awl and needle out of the work, and with the thread controlling mechanism in position to release the thread, so as to permit removal of the work.

6. In a sole sewing machine, the combination of a work support, a presser-foot having locking means, an awl, a needle, a shuttle, thread controlling mechanism including a thread-lock, actuating means for said members, including a drive shaft, and stopping mechanism adapted to arrest the parts, while the shaft is moving in normal operative direction, with the stitch completed, with the presser-foot released, with the awl and needle out of the work, and with the thread controlling mechanism in position to release the thread, so as to permit removal of the work.

7. In a sole sewing machine, the combination of a work support, a presser-foot, an awl, a needle, a shuttle, thread controlling mechanism including a thread-lock, actuating means for the awl, needle, shuttle and thread controlling means, including a drive shaft, means for operating and locking the presser - foot, and stopping mechanism adapted to automatically arrest the parts, while the shaft is moving in normal operative direction at the completion of the stitch with the awl and needle out of the work with the thread-lock open to release the thread, and with presser-foot released to permit removal of the work.

8. In a sole sewing machine, the combination of stitch forming mechanism, a take-up member, means for operating said take-up member constructed to cause it to first take-up and set the stitch and then draw thread from the supply, and means for stopping the machine with the take-up member at the limit of its take-up stroke and with the stitch completed.

9. In a sole sewing machine, the combination of a work support, a presser-foot having locking means, an awl, a needle, thread controlling mechanism including a thread-lock, and operating means, including a drive shaft, constructed and arranged to unlock the presser-foot and cause the thread-lock to release the thread at the completion of the stitch, and during the normal operative movement of the drive shaft, with the awl and needle out of the work.

10. In a sole sewing machine, the combination of a work support, a presser-foot having locking means, an awl, a needle, thread controlling mechanism including a take-up member and a coöperating thread-lock, and operating means, including a drive shaft, constructed and arranged to unlock the presser-foot and cause the thread-lock to release the thread at the completion of the stitch, and during the normal operative movement of the drive shaft, with the take-up member at the limit of its take-up stroke and the awl and needle out of the work.

11. In a sole sewing machine, the combination of stitch forming mechanism, a work support, a movable presser-foot, means to force the presser-foot against the work on the work support with a normally light pressure, means to increase said pressure at intervals and to lock said presser-foot when the pressure has been increased, and means for stopping the machine at the completion of the stitch, during the normal direction of movement, with the presser-foot unlocked.

12. In a sole sewing machine, the combination of stitch forming mechanism, a work support, a movable presser-foot, thread controlling mechanism including a thread-lock, means connecting said presser-foot and said thread-lock constructed to open the thread-lock to release the thread when the presser-foot is raised, means for locking said presser-foot, and means for stopping the machine, during its normal direction of movement, with the presser-foot released.

13. In a sole sewing machine, the combination of stitch forming mechanism, a work support, a movable presser - foot, thread controlling mechanism including a thread-lock adapted to lock the thread when the stitch is taken up and set and release the thread when drawn, means connecting said presser-foot and said thread-lock constructed to open the thread-lock to release the thread when the presser-foot is raised, and means for stopping the machine, during its normal direction of movement, with the presser-foot released.

14. In a sole sewing machine, the combination of stitch forming mechanism, a work support, a movable presser-foot, thread controlling mechanism including a thread-lock, means connecting said presser-foot and said thread-lock constructed to open the thread-lock to release the thread when the presser-foot is raised, means to force the presser-foot against the work on the work support and to lock said presser-foot, and means for stopping the machine at the completion of the stitch, during its normal direction of movement, with the presser-foot unlocked.

15. In a sole sewing machine, the combination of stitch forming mechanism, a work support, a movable presser-foot, thread controlling mechanism including a thread-lock connected with said presser-foot, means for locking said presser-foot, means for stopping the machine with the presser-foot released, and means for raising said presser-foot and for opening said lock through the connection to said presser foot.

16. In a sole sewing machine, the combination of stitch forming mechanism, a work support, a movable presser-foot, thread controlling mechanism including a thread-lock, means connecting said presser-foot and said thread-lock constructed to open the thread-lock to release the thread when the presser-foot is raised, means for locking and unlocking said presser-foot at intervals during the operation of the machine, and operating mechanism constructed to position the parts at the completion of the stitch, during its normal direction of movement, with the presser-foot unlocked.

17. In a sole sewing machine, the combination of stitch forming mechanism, a work support, a movable presser-foot, thread controlling mechanism including a thread-lock connected with said presser-foot, means for locking and unlocking said presser-foot at intervals during the operation of the machine, operating mechanism constructed to position the parts at the completion of the stitch with the presser-foot unlocked, and means for raising said presser-foot and for opening said lock through the connection to said presser-foot.

18. In a sole sewing machine, the combination of a work support, a presser-foot, an awl, a needle, thread controlling mechanism including a thread-lock, means connecting said presser-foot and said thread-lock constructed to open the thread-lock to release the thread when the presser-foot is raised, means for locking and unlocking said presser-foot at intervals during the operation of the machine, and operating mechanism constructed to position the parts at the completion of the stitch, during its normal direction of movement with the awl and needle out of the work and with the presser-foot unlocked.

19. In a sole sewing machine, the combination of a work support, a presser-foot, an awl, a needle, thread controlling mechanism including a thread-lock connected with said presser-foot, means for locking and unlocking said presser-foot at intervals during the operation of the machine, operating mechanism constructed to position the parts at the completion of the stitch with the awl and needle out of the work and with the presser-foot unlocked, and means for raising said presser-foot and for opening said lock through the connection to said presser-foot.

20. In a sole sewing machine, the combination of stitch forming mechanism, a work support, a movable presser-foot, means to force the presser-foot against the work on the work support with a normally light pressure, means to increase said pressure at intervals and to lock said presser-foot when the pressure is released, means for unlocking said presser-foot when the stitch-forming mechanism is out of the work, and means for stopping the machine when the presser-foot is unlocked, so as to permit the presser-foot to be raised to remove the work.

21. In a sole sewing machine, the combination of stitch forming mechanism, a work support, a movable presser-foot, means to force the presser-foot against the work on the work support with a normally light pressure, means to increase said pressure at intervals and to lock said presser-foot when the pressure is released, means for decreasing the increased pressure and for unlocking said presser-foot when the stitch-forming mechanism is out of the work, and means for stopping the machine when the presser-foot is unlocked and the pressure thereon is released, so as to permit the presser-foot to be raised to remove the work.

In testimony whereof we affix our signatures in presence of two witnesses.

GEORGE L. CORCORAN.
GEORGE A. DOBYNE.
AUGUST R. SCHOENKY.

Witnesses:
MARIE E. PAUCK,
J. H. BRUNINGA.